US006424640B1

(12) United States Patent
Park

(10) Patent No.: US 6,424,640 B1
(45) Date of Patent: Jul. 23, 2002

(54) METHOD FOR STORING STATUS INFORMATION OF A TRANSCEIVER IN A BASE STATION

(75) Inventor: Youn Hee Park, Incheon (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/102,922

(22) Filed: Jun. 23, 1998

(30) Foreign Application Priority Data

Jun. 23, 1997 (KR) .............................. 97-26560

(51) Int. Cl.⁷ ................................................ H04J 1/00
(52) U.S. Cl. ........................................ 370/342; 455/435
(58) Field of Search ................................ 370/342–347, 370/329, 270, 441–44, 345–346, 209, 433, 460, 332–335, 260; 714/807–811, 799, 748; 455/12.1, 427, 509–511, 403–410, 419–424, 435, 517, 440, 434–436, 418, 425, 561; 375/356–362, 130, 287, 146–150

(56) References Cited

U.S. PATENT DOCUMENTS

| 5,109,393 A |   | 4/1992 | Saegusa ...................... 375/108 |
| 5,613,191 A | * | 3/1997 | Hylton et al. ............... 370/342 |
| 5,793,744 A | * | 8/1998 | Kanerva et al. ............ 370/209 |
| 5,889,474 A | * | 3/1999 | LaDue .................. 340/825.49 |

* cited by examiner

*Primary Examiner*—Kwang Bin Yao
*Assistant Examiner*—Prenell Jones
(74) *Attorney, Agent, or Firm*—Dilworth & Barrese, LLP

(57) ABSTRACT

A method for storing status information of a transceiver in a Base Station includes the steps of receiving a transceiver status message from a transceiver interface processor and retrieving a system type from Program Load Data (PLD). A value of i as an identifier of a sector and a value of j as an identifier of a CDMA channel are then determined according to each system type and a status information table of a transceiver in a base station is created such that each value of [i, j] derived from the determination step serves as a key to the created table.

21 Claims, 10 Drawing Sheets

| [0,0] | [0,1] | [0,2] | [0,3] | [0,4] |
| [1,0] | [1,1] | [1,2] | [1,3] | [1,4] |
| [2,0] | [2,1] | [2,2] | [2,3] | [2,4] |
| [3,0] | [3,1] | [3,2] | [3,3] | [3,4] |
| [4,0] | [4,1] | [4,2] | [4,3] | [4,4] |
| [5,0] | [5,1] | [5,2] | [5,3] | [5,4] |

IN[I,J],
I ; TIP_ID
J : XCVR_ID

FIG. 6

| [0,0] | [0,1] | [0,2] | [0,3] | [0,4] | [0,5] | [0,6] | [0,7] | [0,8] | [0,9] |
| [1,0] | [1,1] | [1,2] | [1,3] | [1,4] | [1,5] | [1,6] | [1,7] | [1,8] | [1,9] |
| [2,0] | [2,1] | [2,2] | [2,3] | [2,4] | [2,5] | [2,6] | [2,7] | [2,8] | [2,9] |

IN[I,J],
I : SECTOR_ID
J(0~7) : CDMA_CH_INDEX
J(8~9) : USED FOR REDUNDACY XCVR

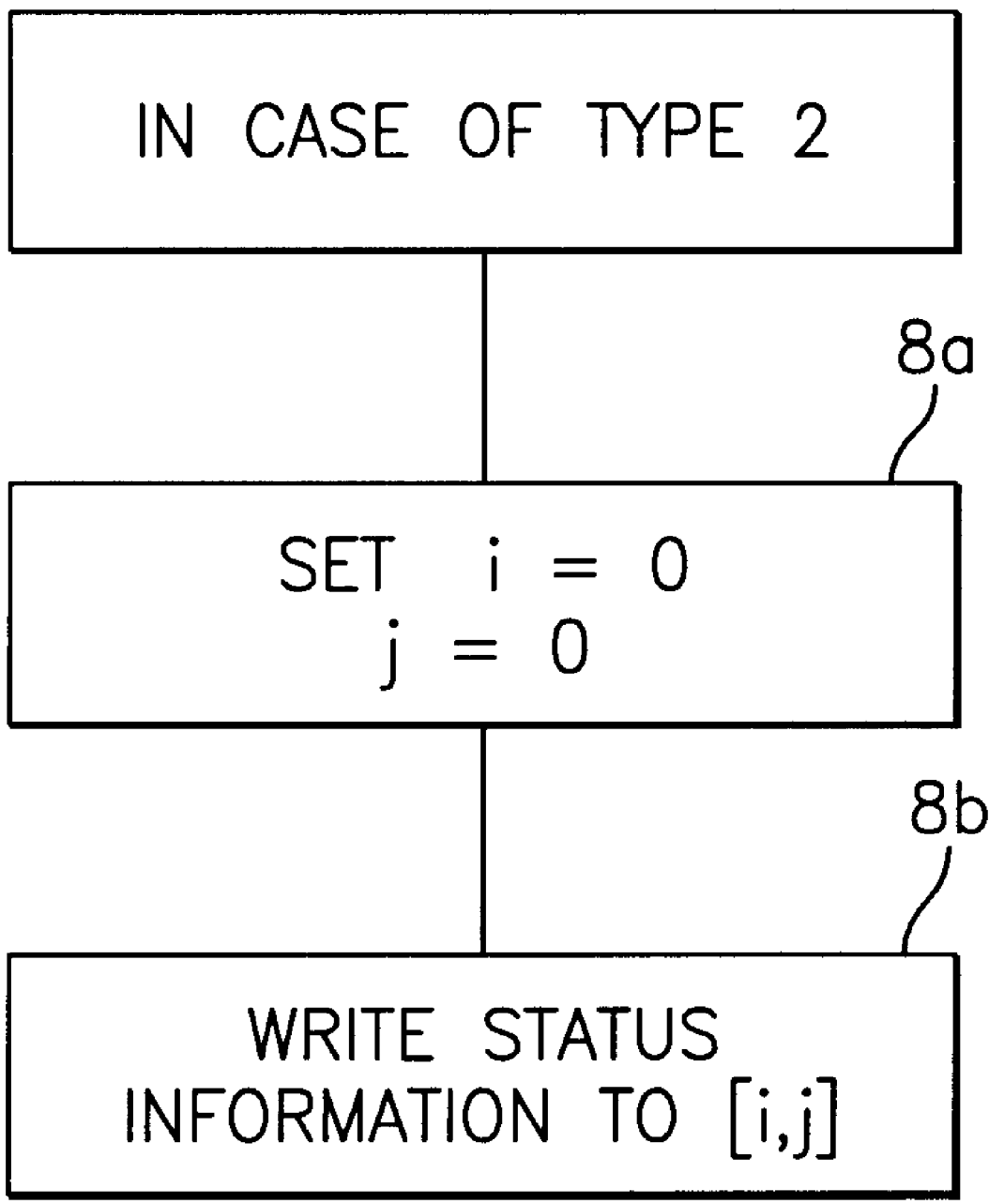
FIB. 8b

US 6,424,640 B1

METHOD FOR STORING STATUS INFORMATION OF A TRANSCEIVER IN A BASE STATION

BACKGROUND OF THE INVENTION

1. Field of the Invention

The present invention relates to status information in wireless (mobile) communication systems. More particularly, it relates to a method for storing the status information of a transceiver in a base station of the wireless communication system.

2. Description of the Related Art

A PCS (Personal Communication Services) system and a CDMA (Code Division Multiple Access) system comprise a number of Base Transceiver Systems (BTSs) which provide services to Mobile Stations, a Base Station Controller (BSC), a Base Station Management System (BSM) which manages a number of BSCs, a Mobile Switching Center (MSC), and a Location Register (LR) system.

The area that each BTS services is called a cell, and the cell is divided into several sectors. The cell is expanded to BTS, BSC, MSC service areas in order.

In a mobile telecommunication system, the MSC system and other systems generally make up a Base Station Subsystem (BSS). The BSS includes the BSM, BSC and BTS in order of precedence. The main processor of the BSC is called a Call Control Processor (CCP) and the main processor of the BTS is called the BTS Control Processor (BCP).

The base station transceiver is a module included in the radio frequency unit of the base station subsystem (BSS) in a CDMA mobile system. The transceiver includes a Transceiver Master Control Unit (XMCU) controlled by a Transceiver Interface Processor (TIP), and a Transceiver Unit (XCVU) controlled by a Transceiver Unit Processor (TRUX).

The TIP receives data from the BCP to generate RF signals and transmits them to the transceiver. The TIP refers to the processor that controls the XMCUs, and the TIPX refers to a software block which is loaded in the TIP. The TIPX also receives transceiver status information and alarm information from the transceiver and transmits the same to the BCP. The TIP is a dual processor having two sides (e.g., A and B), each functioning as an independent processor. That is, one side (e.g., A) is active while the other side (e.g., B) is in a standby state. When a fault occurs in the active side A for whatever reason, the side B (standby side) is activated and side A is placed in the standby state. The TIP downloads the TIPX program from the BCP and activates the respective side when a fault occurs.

The TRUX receives status information of a base station transceiver from the TIPX, and reports the frequency of the transceiver, an output adjustment, an alarm detection and the transceiver status to the TIPX. At the same time, the TRUX performs the function of displaying the transceiver status on an LED such as a 7-segment attached to the front side of each XCVU board. The TRUX also performs monitoring of equipment or non-equipment status of each XCVU board in the base station transceiver, and monitors and controls the PLL locking status and output adjustment.

A base station transceiver can perform a frequency assignment service in a sector.

The BTS Status Handling (BSHX) block, which is a status management block in the BCP, receives a status information message of the base station transceiver from the TIPX, and manages the status of the transceiver. The status of a base station transceiver affects the management of a subcell on the basis of the identifier of the sector including a specific transceiver and the identifier of the CDMA channel. Thus, if the status of a base station transceiver is abnormal, the status of the corresponding subcell also becomes abnormal.

There are several types of base station systems according to the number of the TIPXs and transceivers. A conventional base station transceiver belongs to one of two types (i.e., type 1 or type 2).

A type 1 base station, of an earlier standard base station type, supports a maximum of three sectors and four frequency assignments. To implement five or more frequency assignments, a rack of the same form is needed. The type 2 base station, of the micro base station type, supports a sector, a frequency assignment and no redundant transceiver.

FIG. 1 illustrates the stored status information of a transceiver in a conventional type1 base station. As illustrated, rack1 (110) includes TIP0, TIP1 and TIP2 which each perform the frequency assignment 0 (FA0), the frequency assignment1 (FA1), the frequency assignment2 (FA2) and the frequency assignment3 (FA3), and rack2 (120) includes TIP3, TIP4 and TIP5 which each perform the frequency assignment4 (FA4), the frequency assignment5 (FA5), the frequency assignment6 (FA6) and the frequency assignment7 (FA7). Each TIPX has a redundant (R) transceiver (XCVR0) and four transceivers (XCVR1–XCVR4) for each of the respective frequency assignments. In the type1 system, a rack includes three TIPXs and the transceivers under each of the TIPXs. As illustrated in FIG. 1, two racks (110 and 120) are used to support eight frequency assignments (FA0–FA7).

FIG. 2 illustrates the stored status information of a transceiver in a conventional type2 base station. As illustrated, a rack is composed of a TIPX and a transceiver for processing a frequency assignment.

A BSHX block has a sector identifier such as α, β, γ for each transceiver, and a CDMA channel identifier such as 0, 1, 2, 3, 4, 5, 6, 7. The BSHX block stores the status information of a transceiver from the TIPX in the position designated by the identifiers as a specified table.

FIG. 3 illustrates a status information table of a TIPX and a transceiver stored in the BSHX block. As illustrated, the status information according to the identifier of each TIPX and the identifier of each transceiver are stored in the specified format. In case of type1 and type2 system, i is an identifier of the TIPX and j is an identifier of a transceiver, where [i, j] is a key to retrieve the status information in the table.

In a type1 system, the status information from a transciever0 (XCVR0) to a transceiver4 (XCVR4) in each TIPX is stored in the position of the table according to each identifier, and the transciever0 (XCVR0) becomes redundant. But in a type2 system, only the status information of a transciever0 is necessary, and transciever0 is not redundant.

According to an improvement of the system, the type2 system has been substituted by a type3 and type4 system. In these systems, the maximum number of transceivers is increased to six per conventional TIPX and there is no redundant transceiver, so the message format and the relation scheme of the database are changed.

FIG. 4 illustrates the stored status information of a transceiver in a type3 base station. As illustrated, rack1 (410) can support a frequency assignment (FA0) and three sectors (α,β,γ) and rack2, rack3 and rack4 (420, 430, 440) can support two frequency assignments and three sectors for each frequency assignment. In FIG. 4, four racks are used to support seven frequency assignments (FA0–FA6) and three sectors. Thus, the type3 system can support a maximum of two frequency assignments and three sectors in a rack.

If a system supporting a frequency assignment and three sectors is needed, a TIPX and three transceivers can be used.

FIG. 5 illustrates the stored status information of a transceiver in a type4 base station. As illustrated, a type4 system is a system of small Omni-directional base station type and rack1 (510) can support three frequency assignments (FA0–FA2) and rack2 (520) can support four frequency assignments (FA3–FA6). Therefore, seven frequency assignments can be supported using two racks.

A database to store the status information of a base station transceiver is physically organized according to the system configuration. Thus, if the system configuration is changed, the message format used to communicate with the TIPX must also be changed. Therefore, according to the above, a table in the corresponding database should be changed which makes and it is necessary to find an identifier of the sector including a transceiver, and an identifier of a CDMA channel for every processing of the subcell.

Consequently, in managing of the status of a transceiver that can be changed according to the system, an additional operation must be performed in response to the change of system configuration.

SUMMARY OF THE INVENTION

The present invention for solving the above problem provides a method for storing the status information of a transceiver in a base station. Particularly, this invention is intended to provide a method for creating the table in which the status information can be stored for any type of system by organizing the database that stores the transceiver status information on the basis of a sector identifier and the identifier of the CDMA channel that each transceiver can perform services. Additionally, it is intended to provide a method for flexibly storing the status information of a transceiver for any system configuration by making the subroutine to find the sector identifier and the CDMA channel identifier that serve as a key to the created table.

In one embodiment, the method for storing status information of a transceiver in a base station comprises the steps of: receiving a transceiver status message from a transceiver interface processor; retrieving a system type from Program Load Data (PLD); finding a value of i as an identifier of a sector and a value of j as an identifier of a CDMA channel according to each system type; and creating a status information table of the transceiver in the base station such that each value of [i,j] derived from the finding step serves as a key to the table.

In the embodiment, it is preferable that the system type is one of the type1, type2, type3 and type4 systems. When using a type1 system, the steps for finding the values of i, j and creating the status information table of the transceiver in the base station further comprise the steps of: comparing the value of TIP_ID as an identifier of a transceiver interface processor with a first specific value; setting the identifier i in response to the comparison; comparing the value of XCVR_ID with a second specific value; setting the identifier, j in response to the comparison; and storing the status information to the location of [i, j].

The first specific value compared to the value of TIP_ID is preferably 3, and if the value of TIP_ID is less than 3, i is set to the value of TIP_ID. Otherwise, i is set to a value equal to TIP_ID divided by the maximum number of sectors in the base station. The second specific value compared to the value of XCVR_ID is preferably 0, and if the XCVR_ID value is zero, j is set to 8, otherwise j is set to the value of (XCVR_ID−1).

When using a type2 system, the steps for finding the values of i, j and for creating the status information table of the transceiver in the base station further comprise the steps of: setting the identifiers, i and j, to a first and second specific value, respectively; and storing the status information to the location designated by [i, j]. In the type2 system, the first and second specific values to which the identifiers, i and j are set is zero, respectively.

When working with a type3 system, the steps for finding the values of i, j and for creating status information table of the transceiver in the base station further comprise steps of: comparing the value of TIP_ID with a first specific value; comparing the value of XCVR_ID with a second specific value; setting the identifiers, i and j in response to the comparisons, respectively; and storing the status information to the location of [i, j].

The first specific value compared to the value of TIP_ID is preferably 0, and the second specific value compared to the value of XCVR_ID is preferably 3. If the value of TIP_ID is not equal to zero or if the value of XCVR_ID is greater than or equal to 3, then the process returns to the step of receiving the transceiver status message from the transceiver interface processor.

When working with a type4 system, the steps for finding the values of i, j and for creating status information table of the transceiver in the base station further comprise the steps of: comparing the value of TIP_ID with a first specific value; comparing the value of XCVR_ID with a second specific value; setting the values of i and j in response to the comparisons; and storing the status information to the location of [i, j].

The method further includes a step of setting the identifiers, i and j to the first and second specific values, respectively, after the value of TIP_ID is compared with zero and the value of TIP_ID is equal to zero. If the value of TIP_ID is not equal to zero, then the value of XCVR_ID is compared with the second specific value.

The first specific value compared to the value of TIP_ID is preferably 0, and the second specific value compared to the value of XCVR_ID is preferably 3.

If the value of TIP_ID is equal to 0, the sector identifier i is set to the value of XCVR_ID and the CDMA channel identifier j is set to zero (0). If the value of TIP_ID is not equal to 0, the value of XCVR_ID is then compared with the second specific value of 3. If XCVR_ID is less than 3, the sector identifier i is set to XCVR_ID and the value of CDMA channel identifier j is set to TIP_ID*2−1. If the value of TIP_ID is not equal to the first specific value and the value of XCVR_ID is not less than the second specific value, identifier i is set to the value of XCVR_ID divided by the second specific value, and identifier j is set to a value resulting from multiplying TIP_ID by 2 (i.e., TIP_ID*2).

BRIEF DESCRIPTION OF THE DRAWINGS

Other objects and advantages of the invention will become apparent upon reading the detailed description and upon reference to the drawings.

FIG. 6 illustrates a status information table of a transceiver in a base station according to an embodiment of the present invention;

FIG. 8b illustrates a flow chart to find an identifier of a sector and an identifier of a CDMA channel in case of a type2 system;

DESCRIPTION OF PREFERRED EMBODIMENTS

The invention will be explained in detail with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
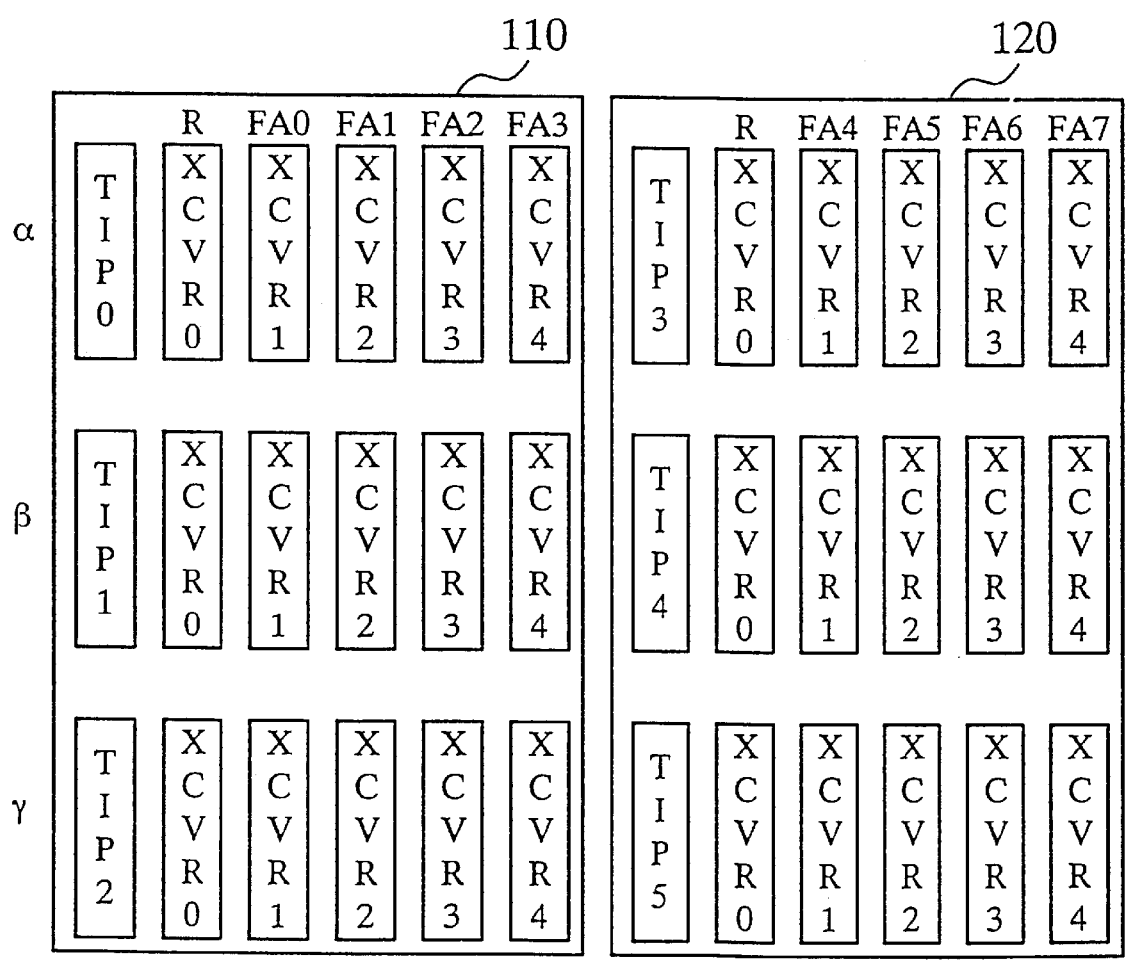
FIG. 1 illustrates the stored status information of a transceiver in a conventional type1 base station.
Figures 2, 3:
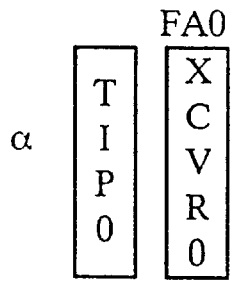
FIG. 2 illustrates the stored status information of a transceiver in a conventional type2 base station.
FIG. 3 illustrates a status information table of a TIPX and a transceiver stored in a BSHX block.
Figure 4:
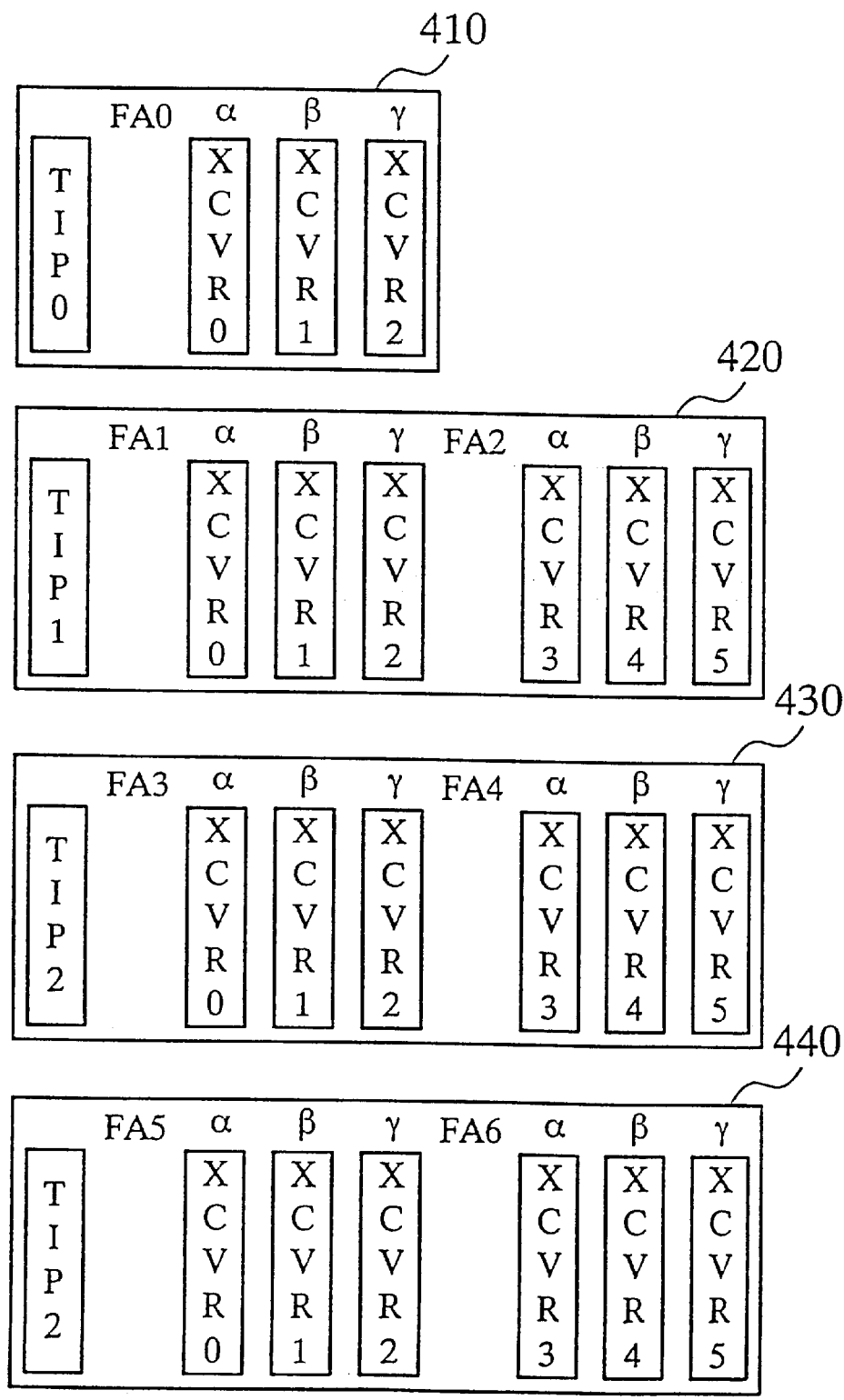
FIG. 4 illustrates the stored status information of a transceiver in a type3 base station.
Figure 5:
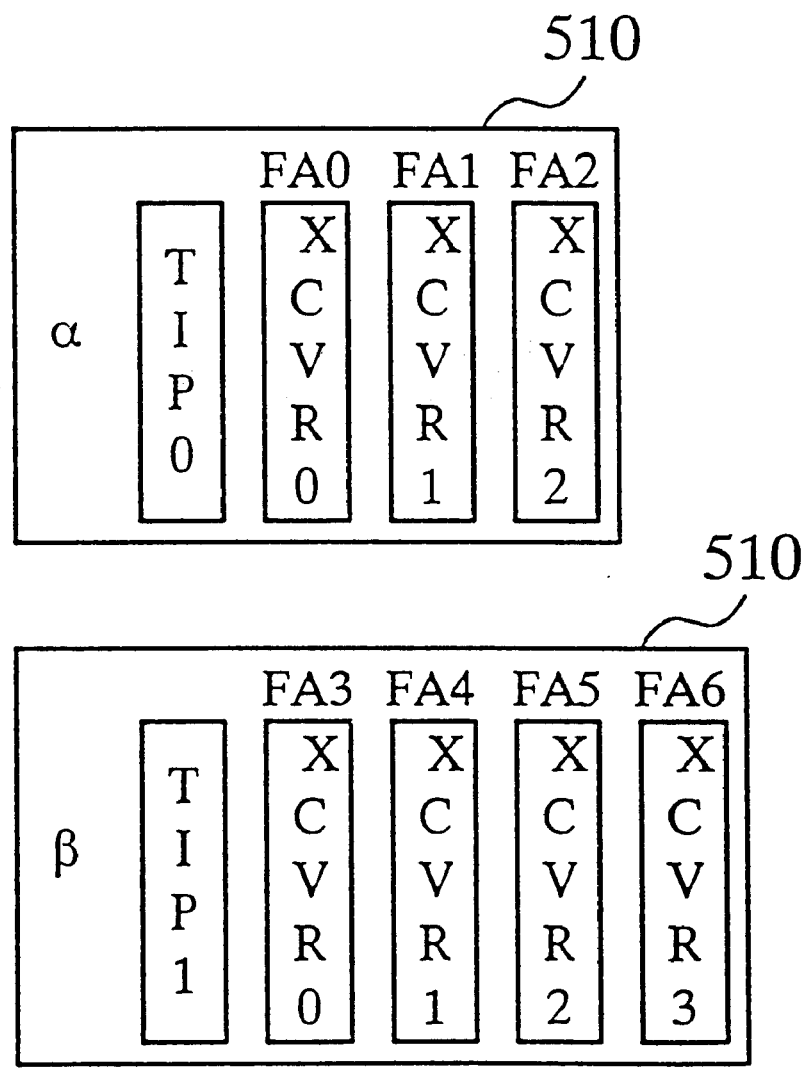
FIG. 5 illustrates the stored status information of a transceiver in a type4 base station.

As illustrated in FIG. 1, a transceiver in a base station can be controlled by a Transceiver Interface Processor (TIPX) that is different for each sector. Namely, each transceiver has its own sector identifier and a CDMA channel identifier, thus it is possible to create a table to manage the status of the transceiver using the sector identifier and the CDMA channel identifier to serve as a key to the created table.

FIG. 6 illustrates a status information table of a transceiver in a base station according to an embodiment of the present invention. As illustrated, the [i, j] entries represent where the status information is stored, i is an index of a sector identifier and j, having a value from 0 to 7, is a CDMA channel identifier. The positions where the value of j is 8 or 9 is for redundant transceivers.

Figure 7:
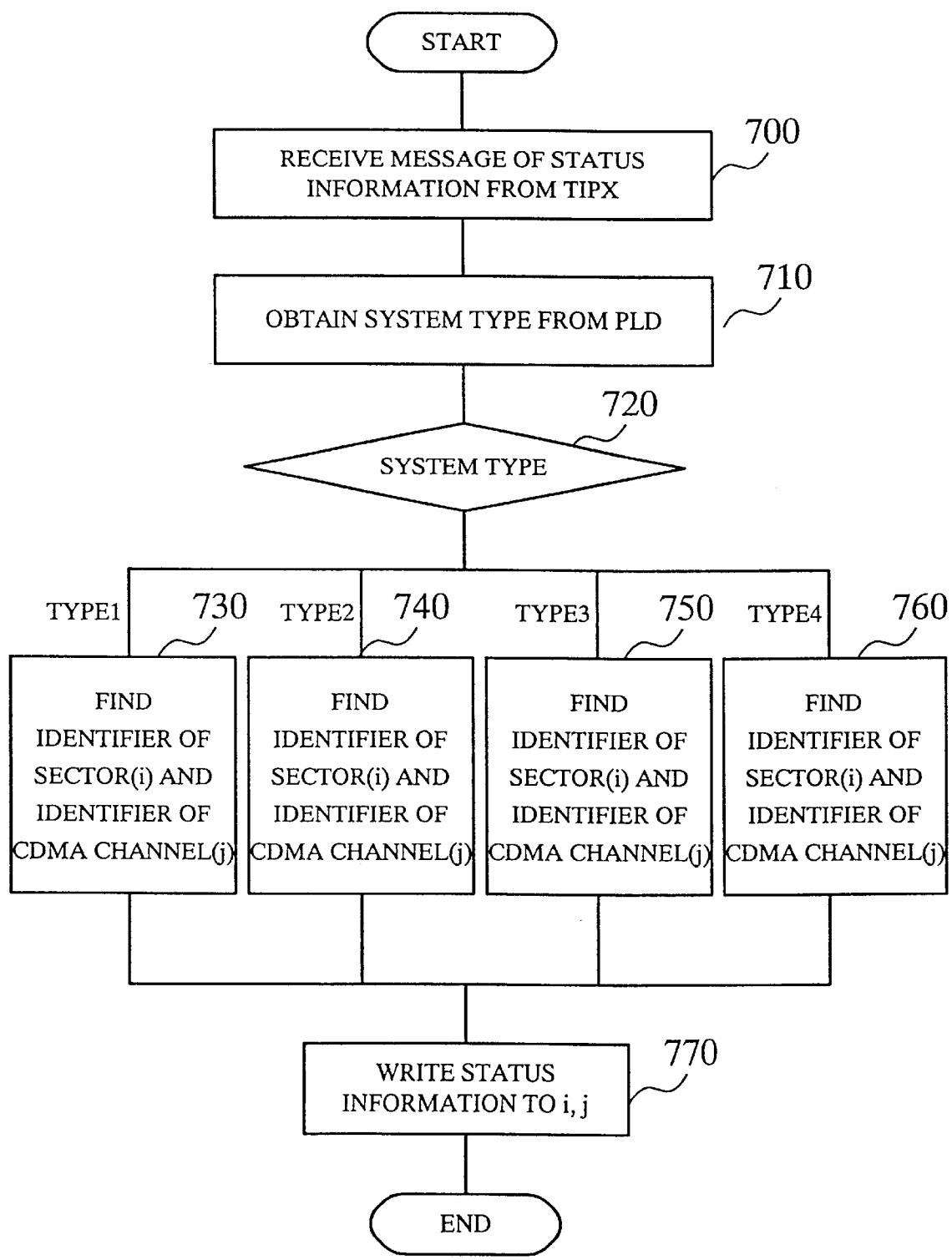
FIG. 7 illustrates a brief flow chart of a method for storing status information of a transceiver in a base station according to an embodiment of the present invention.

FIG. 7 illustrates a brief flow chart of a method for storing the status information of a transceiver in a base station according to the present invention. The TIPX sends a status message for all transceivers under its management to the a Base Station Status Handling (BSHX) block independently of the system configuration. The BSHX determines (at step 700) whether the status information messages have been received from the TIPX. The message sent the BSHX includes the information of all transceivers that a TIPX manages. As such, it is defined as an array having as its elements, the maximum number of transceivers in a TIPX according to the change of system.

The BSHX having received the message then obtains the system type by retrieving the system information from the Program Load Data (PLD) which includes the system configuration information and the subscriber information (710).

The sector identifier (i) and the CDMA channel (j) identifier are obtained according to the obtained system type (720, 730, 740, 750 and 760) using a TIPX identifier and a transceiver identifier. The BSHX then stores the status information of a transceiver using the i and j that serve as a key. (770)

Figure 8A:
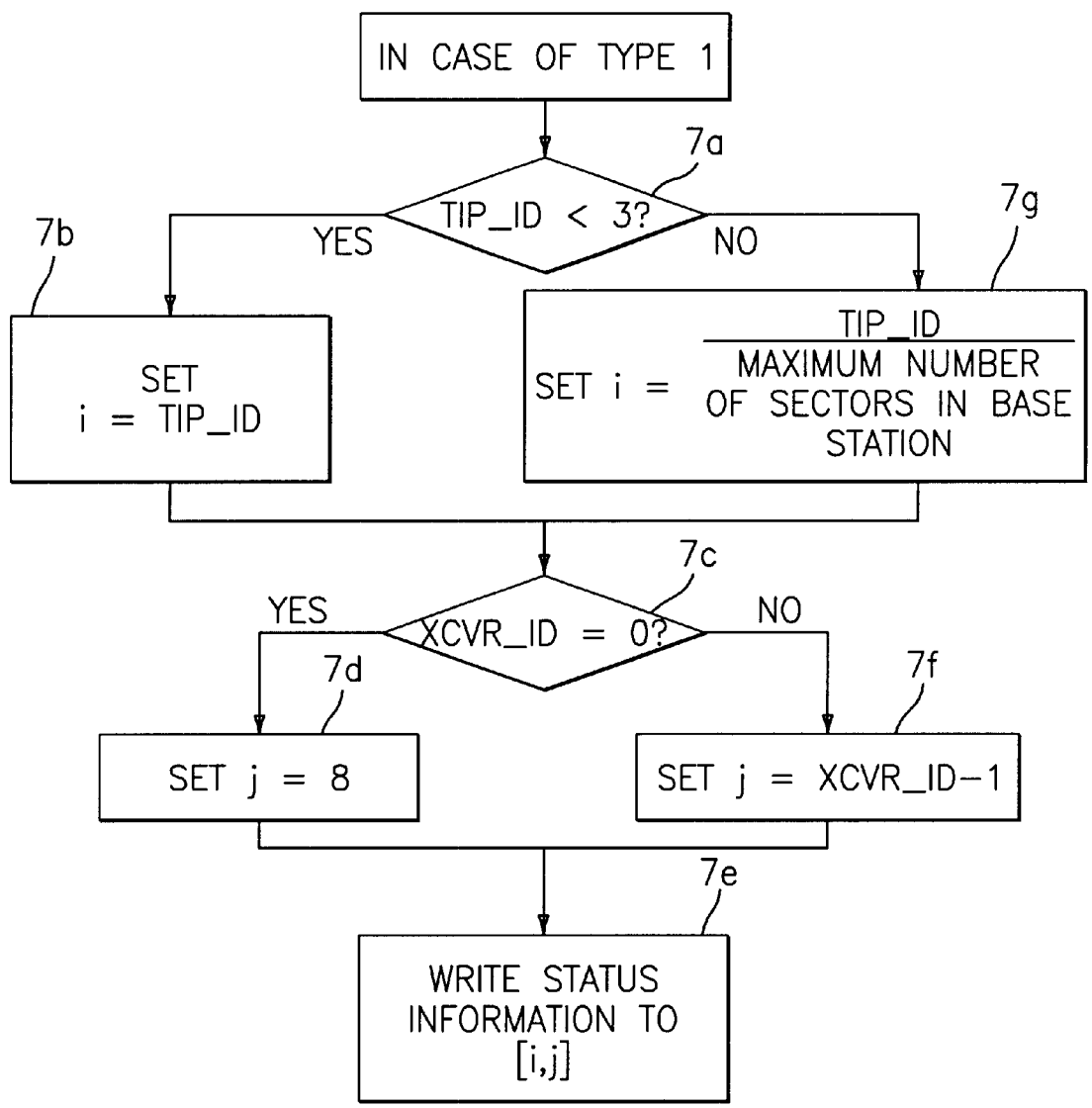
FIG. 8a illustrates a flow chart to find an identifier of a sector and an identifier of a CDMA channel in case of a type1 system.
Figure 8C:
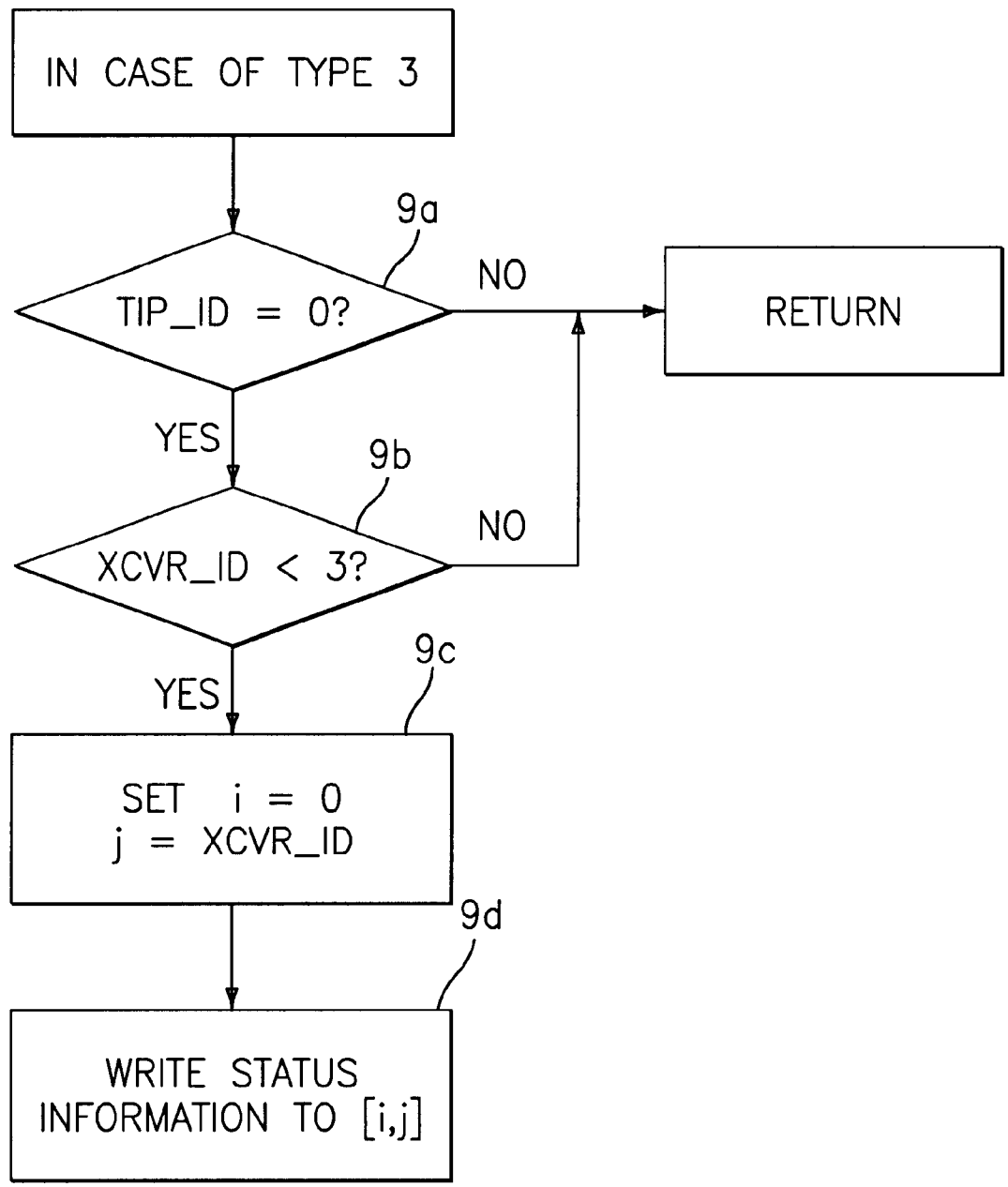
FIG. 8c illustrates a flow chart to find an identifier of a sector and an identifier of a CDMA channel in case of a type3 system.
Figure 8D:
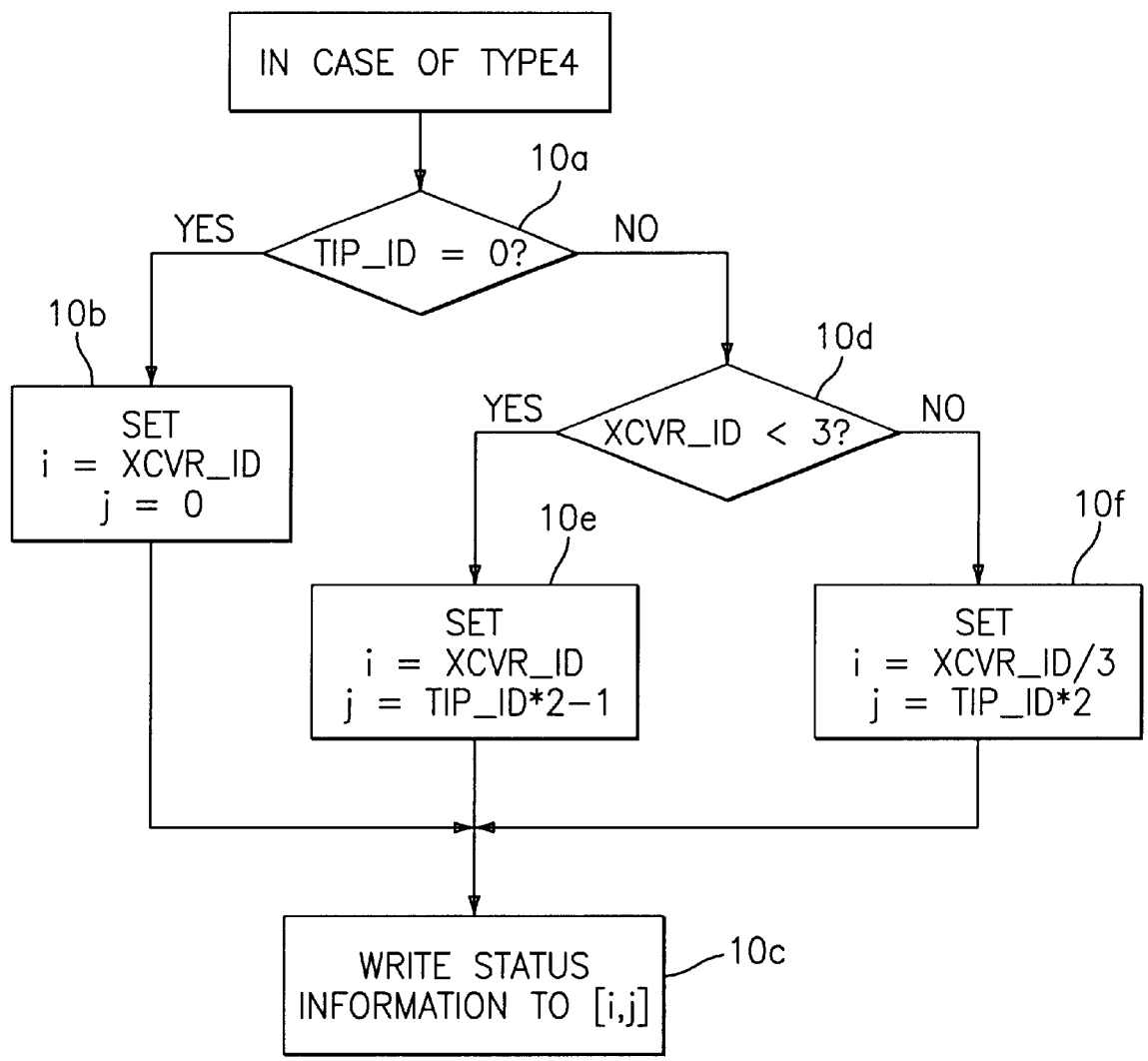
FIG. 8d illustrates a flow chart to find an identifier of a sector and an identifier of a CDMA channel in case of a type4 system.

FIGS. 8a, 8b, 8c and 8d illustrates a flow chart of a method for finding the sector identifier (i) and the CDMA channel identifier according to the present invention wherein FIG. 8a is for a type1 system, FIG. 8b is for a type2 system, FIG. 8c is for a type3 system and FIG. 8d is for a type4 system.

Referring to FIG. 8a in a type1 system, it is determined (at step 7a) whether an identifier (TIP_ID) of a TIP is less than 3. If less than 3, the sector identifier (i) is set (at step 7b) to the value of TIP_ID and serves as a key to obtain the status information of a transceiver. At step 7c, the present identifier of a transceiver (XCVR_ID) is compared with 0. If the XCVR_ID is 0, the CDMA channel identifier j, (i.e., the other key to obtain the status information of a transceiver) is set to 8. The status information is then written to the position of [i, j] (step 7e). If it is determined at step 7c that the present identifier of a transceiver (XCVR_ID) is not 0, then the CDMA channel j is set to XCVR_ID−1 and then the status information is written to the position of [i, j] (step 7e).

If the identifier of the TIP (TIP_ID) is not less than 3 (at step 7a), i is set to the value of TIP_ID divided by the maximum number of sectors in the base station, and j is set through as explained above (steps 7c–7e).

If, as illustrated in FIG. 8b, a type2 system is identified (740), i and j are set to 0 respectively (step 8a) and the status information is written to the position of [i, j] (step 8b).

If, as illustrated in FIG. 8c, a type3 system is identified (750), the TIP_ID is compared with 0 (step 9a). If the TIP_ID is not 0, the system returns to the start of the program and receives new status information. If the TIP_ID is equal to 0, the XCVR_ID is compared with 3 (step 9b). If the XCVR_ID is not less than 3, the system returns to the start of the program and receives new status information. If the XCVR_ID is less than 3, i is set to 0 and j is set to the XCVR_ID (step 9c) and the status information is written to the corresponding position (step 9d).

If, as illustrated in FIG. 8d, a type4 system is identified (760), the TIP_ID is compared with 0 (step 10a). If the TIP_ID is 0, i is set to the XCVR_ID and j is set to 0 (step 10b) and then at step 10c, the status information is written to the corresponding position. When the TIP_ID is not 0, the XCVR_ID is compared with 3. When the XCVR_ID is less than 3, i is set to the TIP_ID and j is set to the value of multiplying the TIP_ID by 2 and subtracting 1 (2TIP_ID−1) (step 10c). The status information is then written to the corresponding position (step 10c). If the XCVR_ID is not less than 3 at step 10d, i is set to the remainder when the value of XCVR_ID is divided by 3 and j is set to the value of multiplying the value of TIP_ID by 2 (step 10f). The status information is then written to the corresponding position (step 10e).

If the position, [i, j] is obtained from the key of the corresponding table through the above steps and the status information of a transceiver is stored in that position, it is possible to access the status information of a transceiver with an identifier of a sector, i and an identifier of a CDMA channel, j. Consequently, it is possible to make a status information table of a transceiver in a base station independent of the system type through the steps as stated above.

What is claimed is:

1. A method for storing status information of a transceiver in a base station comprising the steps of:
   receiving a transceiver status message from a transceiver interface processor;
   retrieving system type information from Program Load Data (PLD);
   finding a value of i as a sector identifier and a value of j as a CDMA channel identifier according to each system type; and
   creating a status information table of the transceiver in the base station such that a value of [i,j] derived from said finding step serves as a key to the created table.

2. The method as claimed in claim 1, wherein said system type is one selected from a group consisting of type1, type2, type3 and type4.

3. The method as claimed in claim 2, wherein said steps for finding the values of i and j and for creating the status information table of the transceiver in the base station for a type1 system further comprise the steps of:
   comparing a value of a transceiver interface processor identifier (TIP_ID) with a first specific value;
   setting the sector identifier i in response to said comparison;
   comparing a transceiver identification value (XCVR_ID) with a second specific value;
   setting the CDMA channel identifier j in response to said comparison; and
   storing the status information to said location of [i, j].

4. The method as claimed in claim 3, wherein the first specific value compared to said TIP_ID value is 3.

5. The method as claimed in claim 3, wherein said step of setting the sector identifier i further comprises the steps of: setting i to the value of TIP_ID when TIP_ID is less than said first specific value; and setting i to a value equal to TIP_ID divided by a maximum number of sectors in the base station when TIP_ID is greater than said first specific value.

6. The method as claimed in claim 3, wherein said second specific value compared to said value of XCVR_ID is 0.

7. The method as claimed in claim 3, said step of setting j further comprises the steps of: setting j equal to 8 when the value of XCVR_ID is equal to the second specific value; setting j to a value equal to (XCVR_ID−1) when the value of XCVR_ID does not equal the second specific value.

8. The method as claimed in claim 2, wherein said steps for finding the values of i and j and for creating the status information table of the transceiver in the base station for a type2 system further comprise the steps of:
   setting said identifiers, i and j respectively to a specific value; and
   storing the status information to said location of [i, j].

9. The method as claimed in claim 8, wherein the specific values given to said identifiers, i and j are zeroes respectively.

10. The method as claimed in claim 2, wherein said steps for finding the values of i and j and for creating the status information table of the transceiver in the base station for a type3 system further comprise the steps of:
    comparing a value of TIP_ID with a first specific value;
    comparing a value of XCVR_ID with a second specific value;
    setting said identifiers, i and j respectively, in response to said steps of comparing; and
    storing the status information to said location of [i, j].

11. The method as claimed in claim 10, wherein said first specific value compared to said value of TIP_ID is 0.

12. The method as claimed in claim 10, wherein said second specific value compared to said value of XCVR_ID is 3.

13. The method as claimed in claim 10, further comprising the step of returning to said step of receiving the transceiver status message from the transceiver interface processor when the value of TIP_ID is not equal to the first specific value.

14. The method as claimed in claim 10, further comprising the step of returning to said step of receiving the transceiver status message from the transceiver interface processor when the value of XCVR_ID is equal to or greater than said second specific value.

15. The method as claimed in claim 10, wherein said step of setting sets the sector identifier i to zero when TIP_ID equals said first specific value, and sets the CDMA channel identifier j to the value of XCVR_ID when XCVR_ID is less than said second specific value.

16. The method as claimed in claim 2, wherein said steps for finding the values of i and j and for creating status information table of the transceiver in the base station for a type4 system further comprise the steps of:
    comparing a value of TIP_ID with a first specific value;
    comparing a value of XCVR_ID with a second specific value when the value of TIP_ID does not equal said first specific value;
    setting identifiers i and j, respectively in response to said steps of comparing; and
    storing the status information to said location of [i, j].

17. The method as claimed in claim 16, wherein said first specific value compared to said value of TIP_ID is 0.

18. The method as claimed in claim 16, wherein said second specific value compared to said value of XCVR_ID is 3.

19. The method as claimed in claim 16, further comprising the step of setting i equal to XCVR_ID and j equal to 0 when the value of TIP_ID is equal to said first specific value.

20. The method as claimed in claim 16, further comprising the step of setting identifier i equal to XCVR_ID and identifier j to (TIP_ID*2−1) when the value of XCVR_ID is less than the said second specific value.

21. The method as claimed in claim 16, further comprising the steps of setting identifier i equal to the value of XCVR_ID/3 and setting identifier j equal to TIP_ID*2 when the value of XCVR_ID is greater than said second specific value.

* * * * *